(12) United States Patent
Ding et al.

(10) Patent No.: US 7,634,367 B1
(45) Date of Patent: Dec. 15, 2009

(54) ESTIMATING FLUIDIC PROPERTIES AND USING THEM TO IMPROVE THE PRECISION/ACCURACY OF METERED FLUIDS AND TO IMPROVE THE SENSITIVITY/SPECIFICITY IN DETECTING FAILURE MODES

(75) Inventors: Zhong Ding, Pittsford, NY (US); Mark Sawczuk, Rochester, NY (US); Scott Stearns, Zurich (CH)

(73) Assignee: Ortho-clinical Diagnostics, Inc., Rochester, NY (US)

( * ) Notice: Subject to any disclaimer, the term of this patent is extended or adjusted under 35 U.S.C. 154(b) by 0 days.

(21) Appl. No.: 11/484,115

(22) Filed: Jul. 11, 2006

Related U.S. Application Data

(60) Provisional application No. 60/698,455, filed on Jul. 12, 2005.

(51) Int. Cl.
G01F 11/00 (2006.01)
G06F 19/00 (2006.01)
G01F 22/00 (2006.01)
G01F 22/02 (2006.01)
G01F 25/00 (2006.01)

(52) U.S. Cl. ............................ 702/50; 73/1.73; 73/1.74; 73/149; 73/863; 73/863.01; 73/863.02; 222/1; 222/14; 222/52; 222/55; 222/56; 222/57; 700/90; 700/213; 700/231; 700/240; 700/301; 702/1; 702/85; 702/100; 702/127; 702/187

(58) Field of Classification Search ................... 73/1.02, 73/1.73, 1.74, 54.09, 863, 1.01, 1.16, 1.57, 73/19.01, 53.01, 54.01, 54.04, 64.48, 64.51, 73/149, 861, 861.01, 863.01, 863.02, 864, 73/864.01; 702/25, 137, 127, 125, 1, 22, 702/33, 45, 50, 55, 85, 100, 101, 138, 155, 702/156, 187, 188, 189; 221/1, 9, 21; 222/1, 222/14, 21, 52, 55, 56, 57, 71; 700/1, 28, 700/32, 90, 213, 231, 240, 301, 305
See application file for complete search history.

(56) References Cited

U.S. PATENT DOCUMENTS 2,577,639 A * 12/1951 Traver ........................ 137/468

(Continued)

FOREIGN PATENT DOCUMENTS

EP 0 608 425 A1 10/1992
WO WO 94/23280 A1 10/1994

OTHER PUBLICATIONS

Declaration under 37 C.F.R. $1.132 relating to Software Upgrade Release by Ortho-Clinical Diagnostics, Inc. dated Jul. 21, 2004.

(Continued)

Primary Examiner—Edward R Cosimano
(74) Attorney, Agent, or Firm—Todd J Burns

(57) ABSTRACT

A method for improving the accuracy or precision of a metered fluid includes: estimating a fluidic property of the fluid being metered; and adjusting one or more control parameters based on the estimated property to improve the accuracy or precision of a metered fluid. Preferably, the estimating the property of the fluid being metered includes: monitoring a physical event during the metering operation to collect sensed data; extracting features from the sensed data; and using the features to estimate fluid properties. In another preferred embodiment, the estimated fluidic property is viscosity and the sensed data is a pressure profile during a fluid aspiration. In another preferred embodiment, the method includes a diagnostic analyzer which includes a metering probe having a hard probe or a probe having a disposable tip and wherein the fluid is a body fluid sample. Another method includes: estimating a fluidic property of the fluid being metered; and adjusting one or more control parameters or thresholds that determine when an error is flagged based on the estimated property to improve the detection of the failure.

17 Claims, 12 Drawing Sheets

U.S. PATENT DOCUMENTS

| | | | | |
|---|---|---|---|---|
| 2,910,943 | A * | 11/1959 | Marshall et al. | 417/216 |
| 4,121,584 | A * | 10/1978 | Turner et al. | 604/246 |
| 4,165,632 | A | 8/1979 | Weber et al. | |
| 4,261,356 | A * | 4/1981 | Turner et al. | 604/246 |
| 4,532,962 | A * | 8/1985 | Campau | 137/842 |
| 5,257,529 | A | 11/1993 | Taniguchi et al. | |
| 5,494,639 | A | 2/1996 | Grzegorzewski | |
| 5,687,092 | A * | 11/1997 | Bretmersky et al. | 702/100 |
| 5,920,829 | A * | 7/1999 | Bretmersky et al. | 702/50 |
| 5,927,547 | A * | 7/1999 | Papen et al. | 222/57 |
| 5,995,909 | A * | 11/1999 | Bretmersky et al. | 702/50 |
| 6,060,320 | A * | 5/2000 | Dorenkott et al. | 436/54 |
| 6,079,283 | A * | 6/2000 | Papen et al. | 73/864.11 |
| 6,083,762 | A * | 7/2000 | Papen et al. | 436/180 |
| 6,094,966 | A * | 8/2000 | Papen et al. | 73/1.74 |
| 6,203,759 | B1 * | 3/2001 | Pelc et al. | 422/100 |
| 6,220,075 | B1 * | 4/2001 | Papen et al. | 73/1.74 |
| 6,422,431 | B2 * | 7/2002 | Pelc et al. | 222/422 |
| 7,361,155 | B2 * | 4/2008 | Sage et al. | 604/65 |
| 2003/0062382 | A1 * | 4/2003 | Savard et al. | 222/52 |
| 2005/0059926 | A1 * | 3/2005 | Sage et al. | 604/65 |
| 2007/0026534 | A1 * | 2/2007 | Graham | 436/180 |

OTHER PUBLICATIONS

Search—Nerac.com—Jan. 19, 2005—Question No. 1289989.001, 6. NDN 113-0071-6964-3: *Living Body Condition measuring apparatus* Pub. No. 0818175/EP-A1.

Search—Nerac.com—Jan. 19, 2005—Question No. 1289989.001., 7. NDN 080-0194-4105-6: *Device and catheter for in vivo determining blood viscosity* Patent. No. 1181074/EP-B1.

Search—Nerac.com—Jan. 19, 2005—Question No. 1289989.001., 8. NDN 080-0137-8248-9: *Sensor for measuring changes of viscosity and/or density* Patent No. 0649012/EP-B1.

Search—Nerac.com—Jan. 19, 2005—Question No. 1289989.001., 9. NDN 080-0050-1358-8: *Capillary flow device* Patent No. 0212314/EP-B1.

Search—Nerac.com—Jan. 19, 2005—Question No. 1289989.001., 10. NDN 080-0031-8125-4: *Method and apparatus for estimating hematocrit in a blood constituent processing system* Patent. No. 2000287651/EP-B1.

Search—Nerac.com—Jan. 19, 2005—Question No. 1289989.001., 11. NDN 124-0541-4039-5: *Spiral flow testing* Pub. No. 2373058/GB-A.

Search—Nerac.com—Jan. 19, 2005—Question No. 1289989.001., 12. NDN 124-0416-5574-5: *Apparatus for blood viscosity determination* Pub. No. 1520370/GB-A.

Search—Nerac.com—Jan. 19, 2005—Question No. 1289989.001., 13. NDN 251-4001-5551-0: *Apparatus and method for simultaneously measuring viscosity of blood and aggregation of blood cells in hemorheometer.*

Search—Nerac.com—Jan. 19, 2005—Question No. 1289989.001., 14. NDN 251-3869-2819-5: *Method determining parametric characteristics of biological fluids.*

Search—Nerac.com—Jan. 19, 2005—Question No. 1289989.001, 15. NDN 251-3864-1072-3: *Blood viscosity measurer and arteriosclerosis measurer.*

Search—Nerac.com—Jan. 19, 2005—Question No. 1289989.001, 16. NDN 251-2498-8801-6: *Apparatus for measuring and collecting body fluid.*

Search—Nerac.com—Jan. 19, 2005—Question No. 1289989.001, 17. NDN 251-2312-8327-5: *Method for the Measurement of the surface tension of biological fluids.*

Search—Nerac.com—Jan. 19, 2005—Question No. 1289989.001., 18. NDN 043-0317-5620-8: *Loaded Filter index calculating method, loaded filter monitoring method and apparatus, and bedside system* Pub. .No. 04081833 JP.

Search—Nerac.com—Jan. 19, 2005—Question No. 1289989.001., 19. NDN 043-0239-0446-9: *Blood viscometer* Pub. No. 02052011 JP.

Search—Nerac.com—Jan. 19, 2005—Question No. 1289989.001., 20. NDN 043-0163-2606-8: *Method for Converting Saliva Component into Blood component, Device Therefor An diagnostic equipment* Pub. No. 00009727 JP.

Search—Nerac.com—Jan. 19, 2005—Question No. 1289989.001., 21. NDN 043-0080-4932-2: *Magnetic Floating Device with viscosity measuring function* Pub. No. 09206374 JP.

Search—Nerac.com—Jan. 19, 2005—Question No. 1289989.001., 22. NDN 263-0437-4976-5: *Method and apparatus of hemorheometer* 2004063722/WO-A1.

Search—Nerac.com—Jan. 19, 2005—Question No. 1289989.001., 23. NDN 263-0312-4462-1: *Method for determining absolute and effective blood viscosity* Pub. No. 2001058356/WO-A3.

Search—Nerac.com—Jan. 19, 2005—Question No. 1289989.001, 24. NDN -263-0257-4050-1: *In-vivo determining the effects of a pharmaceutical on blood parameters* Pub. No. 1999066839/WO-A1.

Search—Nerac.com—Jan. 19, 2005—Question No. 1289989.001, 25. NDN 052-0215-4356-7: *Comparative Determination of viscosity in body fluids* Pub. No. 1998014779/WO-A1.

Search—Nerac.com—Jan. 19, 2005—Question No. 1289989.001., 26. NDN -052-0144-9323-4: *Device for Measuring Viscosity of Liquid* Pub. No. 1993008475/WO-A1.

Search—Nerac.com—Jan. 19, 2005—Question No. 1289989.001., 27. NDN 052-0106-2314-9: *Serum Fibrinogen Viscosity in clinical medicine*, 1984002982/WO-A1 Pub. No. 1984002982/WO-A1.

Search—Nerac.com—Jan. 19, 2005—Question No. 1289989.001., 28. NDN 190-0164-7921-3: *Apparatus for keeping viscosity of fluid* Pub. No. 06154294 JP.

Search—Nerac.com—Jan. 19, 2005—Question No. 1289989.001., 29. NDN 190-0146-7695-0: *Liquid Viscosity Measurement Method and its device* Pub. No. 05306986 JP.

Search—Nerac.com—Jan. 19, 2005—Question No. 1289989.001, 30. NDN 190-0020-1386-9: *Sensor for measuring change in viscosity of blood or the like* Pub. No. 01239433 JP.

Search—Nerac.com—Jan. 19, 2005—Question No. 1289989.001., 31. NDN 075-0287-6856-4: *Viscosity Measuring Apparatus* Pub. No. 60194330 JP.

Search—Nerac.com—Jan. 19, 2005—Question No, 1289989.001., 32. NDN 075-0284-8665-4: *Measurement of change in physical properties of liquid and semi-solid substance* Pub. No. 60152943 JP.

Search—Nerac.com—Jan. 19, 2005—Question No. 1289989.001., 33. NDN 269-3163-7116-1: *Viscosity measuring apparatus and method of use* US Pat. No. 06805674.

Search—Nerac.com—Jan. 19, 2005—Question No. 1289989.001., 34. NDN 269-3159-8141-6: *Method for determining a characteristic viscosity-shear rate relationship for a fluid* US Pat. No. 06796168.

Search—Nerac.com—Jan. 19, 2005—Question No. 1289989.001, 35. NDN 269-3138-6890-4: *Dual riser/single capillary viscometer* US Pat. No. 06745615.

Search—Nerac.com—Jan. 19, 2005—Question No. 1289989.001., 36. NDN 269-3133-2395-9: *Single riser/single capillary blood viscometer using mass detection or column height detection* US Pat. No. 06732573.

Search—Nerac.com—Jan. 19, 2005—Question No. 1289989.001., 37. NDN 269-3124-4254-5: *Method for the determination of the viscosity of a liquid such as blood* US Pat. No. 06711943.

Search—Nerac.com—Jan. 19, 2005—Question No. 1289989.001., 38. NDN 269-3123-3414-8: *Method, device and catheter for in vivo determining blood properties such as blood viscosity* US Pat. No. 06709390.

Search—Nerac.com—Jan. 19, 2005—Question No. 1289989.001., 39. NDN 269-3071-9313-7: *Method and arrangement for measuring characteristics of a non-newtonian fluid* US Pat. No. 06591664.

Search—Nerac.com—Jan. 19, 2005—Question No. 1289989.001., 40. NDN 269-2955-0548-2: *Method of analyzing data from a circulating blood viscometer for determining absolute and effective blood viscosity* US Pat. No. 06322525.

Search—Nerac.com—Jan. 19, 2005—Question No. 1289989.001., 41. NDN 269-2873-9377-2: *Method of and apparatus for echographic determination of the viscosity and the pressure gradient in a blood vessel* US Pat. No. 06135957.

Search—Nerac.com—Jan. 19, 2005—Question No. 1289989.001., 42. NDN 056-2769-1028-0: *Biosensor* US Pat. No. 05892144.

Search—Nerac.com—Jan. 19, 2005—Question No. 1289989.001., 43. NDN 056-2727-5367-6: *Comparative determinants of viscosity in body fluids obtained with probes providing increased sensitivity* US Pat. No. 05792660.

Search—Nerac.com—Jan. 19, 2005—Question No. 1289989.001., 44. NDN 064-2602-4075-5: *Device for detecting the change of viscosity of a liquid electrolyte by depolarization effect* US Pat. No. 05491408.

Search—Nerac.com—Jan. 19, 2005—Question No. 1289989.001., 45. NDN 064-2479-0544-7: *Apparatus for detecting a change of viscosity* US Pat. No. 05181415.

Search—Nerac.com—Jan. 19, 2005—Question No. 1289989.001., 46. NDN 064-2398-9740-4: *Method for measurement of viscosity change in blood or the like and sensor thereof* US Pat. No. 04947678.

Search—Nerac.com—Jan. 19, 2005—Question No. 1289989.001., 47. NDN 067-2365-1285-0: *Process and apparatus for measuring blood viscosity directly and rapidly* US Pat. No. 04884577.

Search—Nerac.com—Jan. 19, 2005—Question No. 1289989.001.,48. NDN 067-2355-8727-5: *apparatus and method for measuring native mammalian blood viscosity* US Pat. No. 04858127.

Search—Nerac.com—Jan. 19, 2005—Question No. 1289989.001., 49. NDN 067-2278-9793-0: *Method and apparatus for measuring the rheological characteristics of a fluid, in particular of a biological fluid such as blood* US Pat. No. 04643021.

Search—Nerac.com—Jan. 19, 2005—Question No. 1289989.001., 50. NDN 067-2255-4054-0: *Method for measuring changes in a physical property of liquid and semisolid materials* US Pat. No. 04578988.

Search—Nerac.com—Jan. 19, 2005—Question No. 1289989.001., 51. NDN 067-2251-1576-4: *Device and method of measuring the viscosity and/or visco-elasticity of a fluid* US Pat. No. 04566314.

Search—Nerac.com—Jan. 19, 2005—Question No. 1289989.001., 52. NDN 067-2246-4083-8: *Apparatus for determining the viscosity of fluids, in particular blood plasma* US Pat. No. 04554821.

Search—Nerac.com—Jan. 19, 2005—Question No. 1289989.001., 53. NDN 067-2233-0384-2: *Blood viscosity instrument* US Pat. No. 04517830.

Search—Nerac.com—Jan. 19, 2005—Question No. 1289989.001, 54. NDN 067-2196-3565-2: *Diluent and method for potentiometric assay of liquids.* US Pat. No. 04416735.

Search—Nerac.com—Jan. 19, 2005—Question No. 1289989.001., 55. NDN 067-2186-2100-0: *Apparatus for automatically measuring the viscosity of liquids* Pat. No. 04388823.

Search—Nerac.com—Jan. 19, 2005—Question No. 1289989.001., 56. NDN 068-2105-6886-8: *Method of measuring the fluidity of liquids for medical and pharmaceutical purposes, and apparatus for performing the method* US Pat. No. 04165632.

Search—Nerac.com—Jan. 19, 2005—Question No. 1289989.001., 57. NDN 198-0382-5960-4: *Apparatus and method for measuring blood characteristics* US Pat. No. 03766774.

Search—Nerac.com—Jan. 19, 2005—Question No. 1289989.001., 58. NDN 198-0370-0632-9: *Apparatus and method for measuring mammalian blood viscosity* US Pat. No. 03720097.

Search—Nerac.com—Jan. 19, 2005—Question No. 1289989.001, 59. NDN 198-0369-8096-1: *Viscosity measuring device* US Pat. No. 03719075.

\* cited by examiner

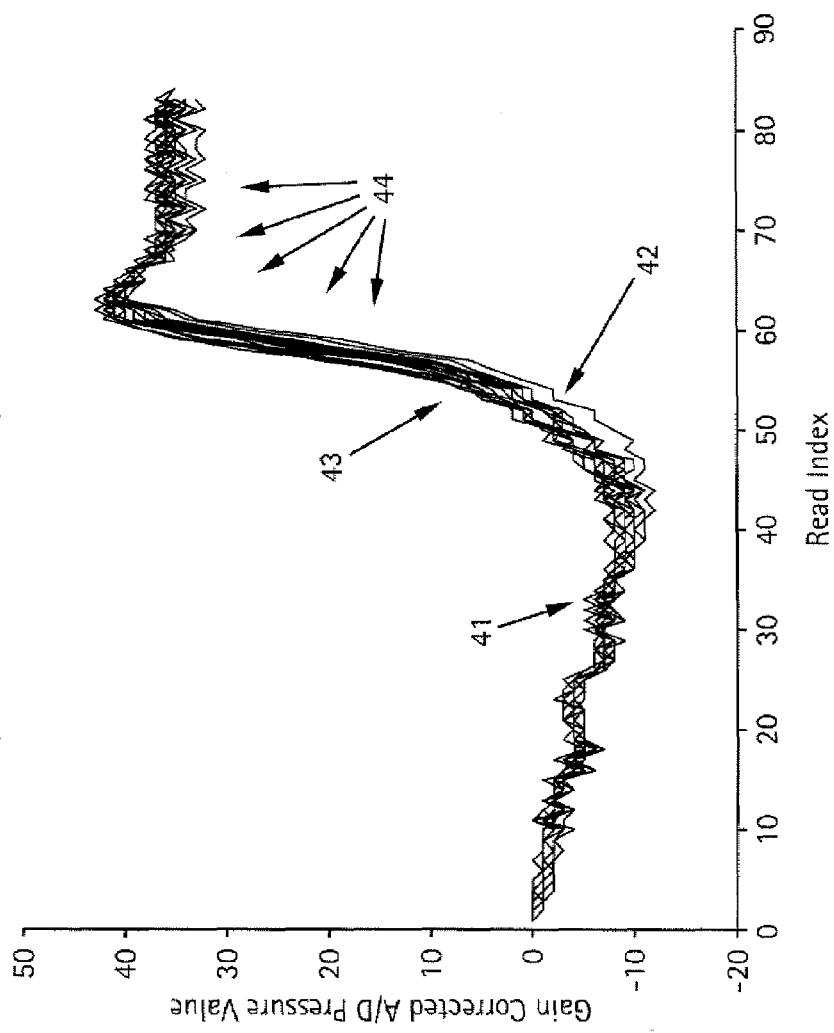

ESTIMATING FLUIDIC PROPERTIES AND USING THEM TO IMPROVE THE PRECISION/ACCURACY OF METERED FLUIDS AND TO IMPROVE THE SENSITIVITY/SPECIFICITY IN DETECTING FAILURE MODES

This application claims priority to provisional application U.S. Ser. No. 60/698,455 filed Jul. 12, 2005, now abandoned.

BACKGROUND OF THE INVENTION

The present invention relates to improving the precision and/or accuracy of fluids aspirated or dispensed. In particular, the present invention relates to automated diagnostic analyzers having improved aspirate or dispense accuracy and/or precision. The present invention also relates to having improved sensitivity/specificity in detecting failure modes.

Known diagnostic analyzers include immunodiagnostic analyzers such as the Vitros® ECi immunodiagnostic analyzer, or clinical chemistry analyzers such as the Vitros® 5.1 FS, both sold by Ortho-Clinical Diagnostics, Inc. All such analyzers are collectively called diagnostic analyzers. Such systems rely on the assurance that a proper sample volume and/or reagent will be delivered in order to give a precise reported assay result. The precision and/or accuracy of delivered fluid volumes are typically known and often a significant contributor to the precision and accuracy of reported results.

Another problem in providing precise and accurate reported assay results are failure modes. Such failure modes can include clots, excessively high viscosity and bubbles, all of which can cause imprecision and inaccuracy in delivered fluid volumes. Typically, when a failure mode is detected, the reported result is suppressed or the process is aborted, and another assay must be carried out at the expense of additional sample, reagents and time. Some diagnostic analyzers use pressure detection systems to monitor the aspiration and dispense of sample and reagent liquids. However, many analyzers use flow-based systems and sensors other than pressure sensors to monitor flow rate for aspirating and dispensing a fluid. Based on research and math models it has been determined that electrical signals for flow monitoring within incompressible fluids creates a significant amount of noise and are not robust for failure detection. Pressure monitoring of compressible fluids and vision based monitoring systems yield more reliable failure detection capabilities.

In an attempt to conserve sample volume, especially in pediatric and geriatric settings, and in an attempt to minimize reagent usage for cost consideration, test volumes are under constant pressure to be reduced. As volumes are reduced below 5 µL, liquid handling system requirements for precision and accuracy are becoming more stringent. Small deviations in delivered volume of liquid have a direct affect on the reaction and result. Some known art describes detecting liquid handling error modes such as bubbles, clots and foam as well as predicting that an aspirated volume is insufficient to allow reporting of a result. See, e.g., U.S. Pat. Nos. 6,060,320, 6,422,431, 6,083,762, 6,220,075, 6,094,966, 5,927,547, 6,079,283 and 6,203,759, which all disclose aspirating and/or dispensing liquids using an aspirate/dispense probe. EP 608425 discloses a device for measuring viscosity of liquids. U.S. Pat. No. 5,257,529 discloses a method and device for the measurement of viscosity of liquids. WO 94/23280 discloses a method for the measurement of the surface tension of biological fluids. U.S. Pat. No. 4,165,632 discloses a method and apparatus for measuring the fluidity of liquids. U.S. Pat. No. 5,494,639 discloses a biosensor for measuring changes in viscosity and/or density of a fluid.

For the foregoing reasons, there is a need for a method of metering a liquid that can sense and correct for variations in the volume of a metered liquid, and hence, more accurately estimate the actual volume of metered liquid. There is also a need for a method that can accurately detect failure modes in a metered fluid.

SUMMARY OF THE INVENTION

The present invention is directed to a method that solves the foregoing problems improving the precision and accuracy of a metered fluid and to accurately detect failure modes in a metered fluid.

One aspect of the invention is directed to a method for improving the accuracy or precision of a metered fluid. The method includes: estimating a fluidic property of the fluid being metered; and adjusting one or more control parameters based on the estimated property to improve the accuracy or precision of a metered fluid. Preferably, the estimating the property of the fluid being metered includes: monitoring a physical event during the metering operation to collect sensed data; extracting features from the sensed data; and using the features to estimate fluid properties. In another preferred embodiment, the estimated fluidic property is viscosity and the sensed data is a pressure profile during a fluid aspiration.

In another preferred embodiment, the method includes a diagnostic analyzer which includes a metering probe having a hard probe or a probe having a disposable tip and wherein the fluid is a body fluid sample.

Another aspect of the invention provides a method for improving the detection of a failure mode. The method includes: estimating a fluidic property of the fluid being metered; and adjusting one or more control parameters or thresholds that determine when an error is flagged based on the estimated property to improve the detection of the failure. In a preferred embodiment, the estimating the fluidic property of the fluid being metered includes: monitoring a physical event during the metering operation to collect sensed data; extracting features from the sensed data; and using the features to estimate fluidic properties. Preferably, the estimated fluidic property is viscosity and the sensed data is a pressure profile during a fluid aspiration.

Further objects, features and advantages of the present invention will be apparent to those skilled in the art from detailed consideration of the preferred embodiments that follow.

BRIEF DESCRIPTION OF THE DRAWINGS

FIG. 4 is a pressure profile of sample dispense to a slide.

DETAILED DESCRIPTION OF PREFERRED EMBODIMENTS

The present invention relies on estimating fluidic properties of a liquid, i.e., the property of the fluid, and using the knowledge of the fluidic properties to improve precision and accuracy of many metering operations. For example, in one instance a sample aspirate bias (i.e., imprecision) was found to be coupled to the fluidic property of viscosity. Based upon this knowledge a compensation function was implemented to resolve the bias. A compensation function is something that creates an adjustment to an output, parameter or control based on other information around it. Typical compensation functions use things such as linear combiners, which are well known in the art. Alternatively, the knowledge of fluidic properties can be used to determine failure modes in a metering operation.

As used herein, "fluidic properties" is defined as a characteristic of a fluid, such as viscosity, surface tension, density, polarity, ionic characteristics, etc.

As used herein, "metering" is defined as the operation of aspirating or dispensing a fluid in a metering vessel in which a fluid is pulled into the vessel to be dispensed at a later time. In a preferred embodiment the metering vessel is a hard probe (i.e., a probe that is not disposable and is typically washed after each use or a probe having a disposable tip. Metering generally (but not always) requires a pump, e.g., a piston pump, for aspirating and dispensing a fluid.

As used herein "failure mode" is defined as an undesirable event that occurs during a fluid handling process, such as aspiration. A failure mode can include aspirating a bubble, clot or fibrin(s), perfusion, or being at the wrong height for dispense.

Figure 1:
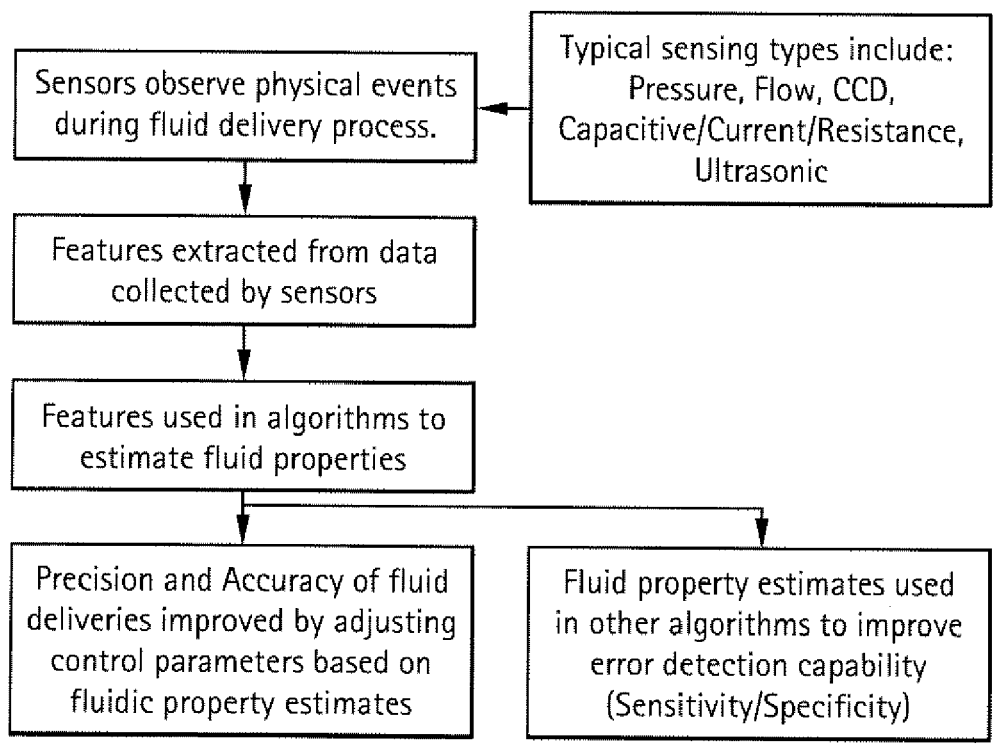
FIG. 1 is a flowchart showing a general outline of the present invention.

A generic overview of the present invention is shown in FIG. 1. As shown in FIG. 1, sensors, such as pressures transducers, flow sensors, CCD, capacitive/current/resistance and ultrasonic to name a few sense or record physical events. A "physical event" is a fluid handling event, such as aspirating, dispensing, contacting the fluid, moving the fluid, e.g., with a tip or probe. Monitoring the physical event results in the creation of collected sensed data, such as the creation of a pressure profile. Data from the monitored physical events is collected and certain features are ascertained from them to be used for further analysis. Data can include recorded pressure signals within a control volume, flow signals through a tube, distance signals between a source and a target (one or both can be in motion), images or recorded video sequences of events, etc. A "feature" is defined as a measurable or estimable quantity/property that makes two events distinct from each other. Examples include column breaks (described below), and amplitude and frequency of pressure profiles. These features are subsequently used in algorithms known in the signal processing art to estimate a fluidic property, such as viscosity. Additional algorithms are used with the fluidic properties to:

1) Modify control parameters to which control the dispense flow rate, height, number of pump steps displaced, etc. used in controlling fluid delivery of a particular fluid and improve precision and accuracy of delivered volumes.
2) Improve failure detection capabilities monitoring error modes on subsequent fluid deliveries using the same fluid.

Now reference will be made to the following non-limiting embodiments showing how fluidic properties are estimated and how the estimated properties are used in improving accuracy or delivery of a metered fluid or improving failure mode detection.

1. Estimating Fluidic Properties

A. Estimating Viscosity

If no errors are detected during primary sample aspiration, the sample viscosity is estimated from a few points in the pressure profile. The current method to estimate viscosity is based on a heuristic model. To estimate viscosity, calibration curves are first developed based on fluids having known viscosities. The fluid with the unknown viscosity, e.g., sample being analyzed, is then aspirated and the pressure profile is plotted. The pressure profile is the collected sensed data of the fluid. Based on a weighted sum of several points (i.e., features), a viscosity estimate is obtained for the unknown fluid.

Figure 2:
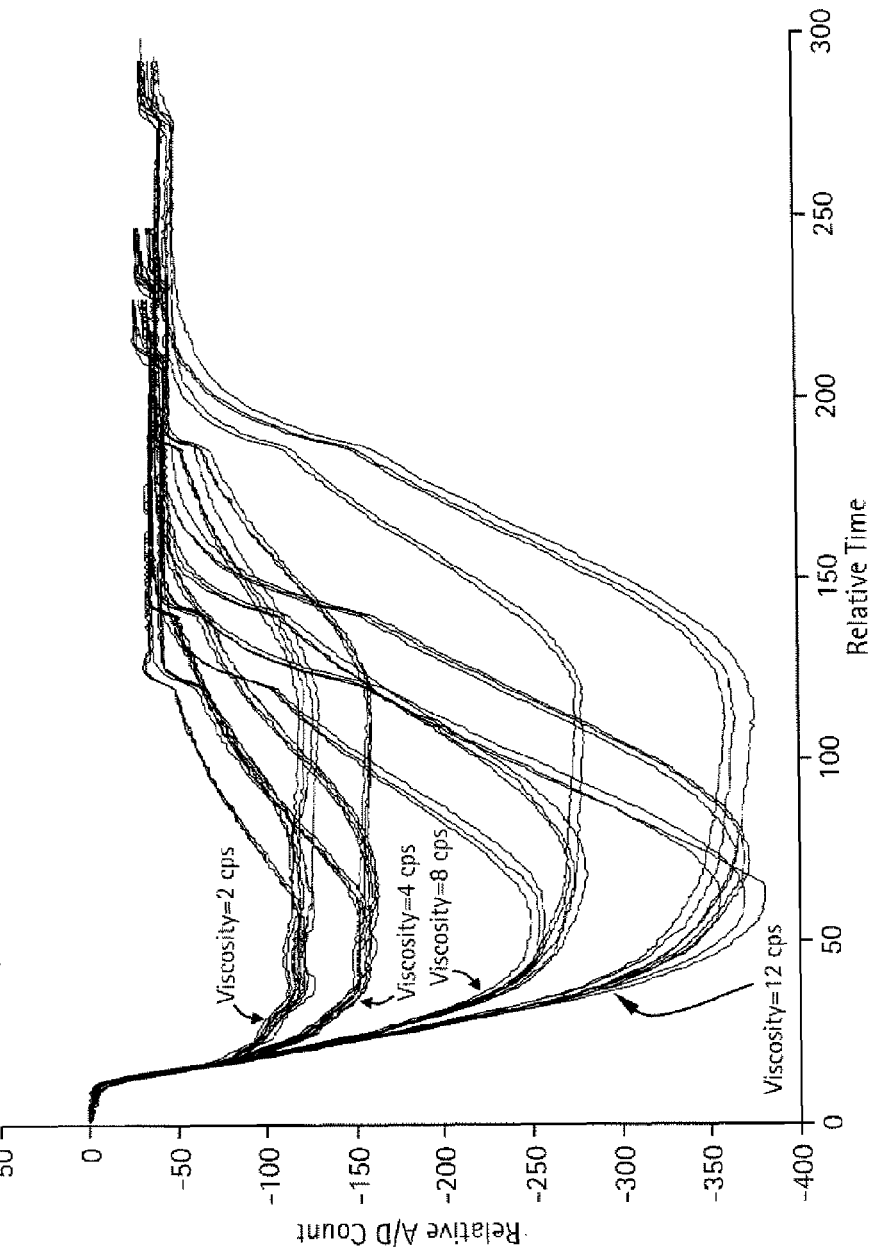
FIG. 2 is a graph showing sample aspirate pressure profiles according to a preferred embodiment of the present invention.

FIG. 2 shows pressure profiles for different viscosity fluids. The x-axis is relative time and the y-axis in relative pressure in A/D counts, wherein A/D counts are analog/digital counts as is known in the art. As FIG. 2 shows, at the beginning of the plot, there 4 bands of profiles. These correspond to the 4 fluid viscosities used in this test. The four fluid viscosities were 2, 4, 8 and 12 cp. The different length profiles in each of the bands, correspond to different volumes of the same viscosity fluids. Once the viscosity has been determined, it will be used as described below. To determine viscosity for an unknown fluid, similar fluids having range of known properties (e.g., viscosity) are used e.g. serum from 1-12 cp. Sensed data from metering events of known viscosities are plotted and coefficients for future viscosity estimation are obtained, which can then be used to estimate the viscosity of the unknown fluid.

If one wants to estimate the viscosity of a different fluid type such as a reagent, one would need to collect experimental data for that fluid with a varying viscosity, and extract similar pertinent features, then fit those features to a known viscosity to obtain coefficients for a fit. With a new set of coefficients, one can estimate the viscosity of other fluids of that fluid type with unknown viscosity. (assuming that they are in the range of viscosities tested.)

B. Estimating Surface Tension

Figure 3A:
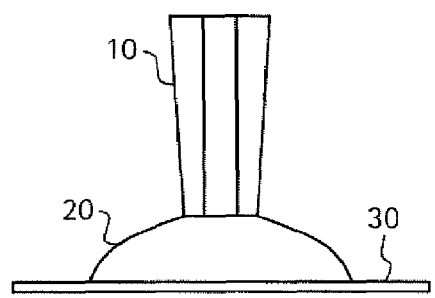
FIGS. 3A-3D show the stages of a fluid column elongating and breaking after dispense onto a dry chemistry slide according to a preferred embodiment of the present invention.
Figure 3B:
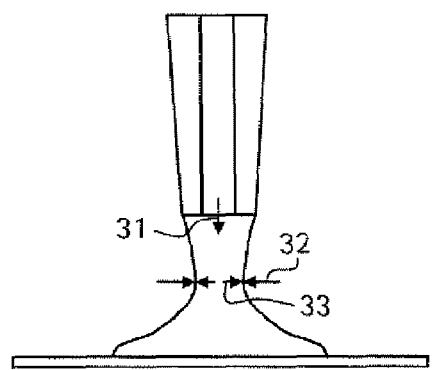
Figure 3C:
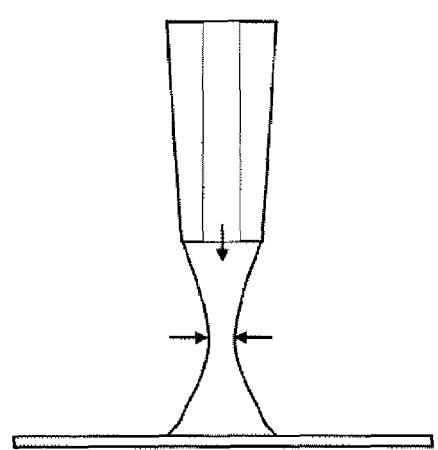
Figure 3D:
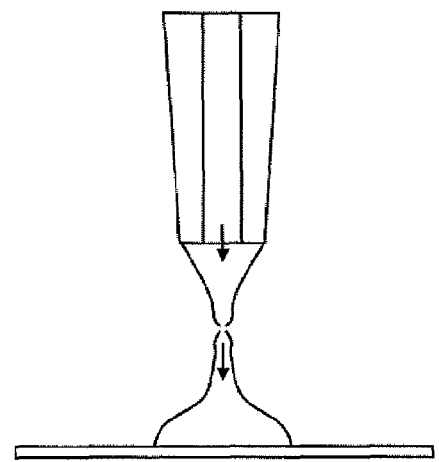

Another fluidic property that can be estimated according to the present invention is the surface tension of the fluid being metered. FIGS. 3A-3D show an enlarged view of a tip on the end of a metering probe shown as reference numeral 10. In the embodiment shown in FIG. 3A, the tip has just dispensed an amount of fluid 20 onto a fluid receiving surface 30, such as a dry chemistry slide. In FIG. 3A, the fluid joins the probe tip and slide at the end of the dispense process. As the tip begins to lift, the fluid will start to neck. Arrow 31 shows the force of fluid being pulled out of the tip. Arrows 32 and 33 show equal forces of surface tension acting opposite of each other. These forces tend to keep the fluid column intact. In FIG. 3C, the internal forces are no longer present and the external force causes the column to break. In FIGS. 3B and 3C, the fluid column continues to stretch until it finally breaks and responds to the imbalance. In FIG. 3D, the fluid recovers after the neck breaks. During the tip withdrawal the pressure profile is measured and is shown in FIG. 4.

FIG. 4 show pressure profiles for several dispenses from a probe tip to a slide. As shown by the arrow 41, as the probe moves up away from the slide, a small vacuum is created because the fluid is being slightly pulled out of the tip as the fluid column stretches. Arrow 42 shows the necking of the fluid column as illustrated in FIGS. 3B and 3C. Arrow 43 shows the break of the column as illustrated in FIG. 3D. Arrow 44 shows a second order response to the fluid column break.

As shown in FIG. 4, the pressure profile from the fluid column break to the end of fluid recovery is very similar to a differential equation second order response. As explained below, parameters in the math model can be shown to relate to viscosity and surface tension. The following equation describes the standard Laplace second order response.

$$H(s) = s^2 + 2\xi\overline{\omega}_n s + \overline{\omega}_n^2 \tag{1}$$

The system dampening is represented by $\xi$ and is highly coupled to, i.e. dependent on, viscosity. $\omega_n$ is the natural frequency and related to the surface tension of the fluid. The surface tension of the fluid acts similarly to a spring in a mass/damper/spring mechanical system. The relationship is illustrated in FIG. 5.

Figure 5:
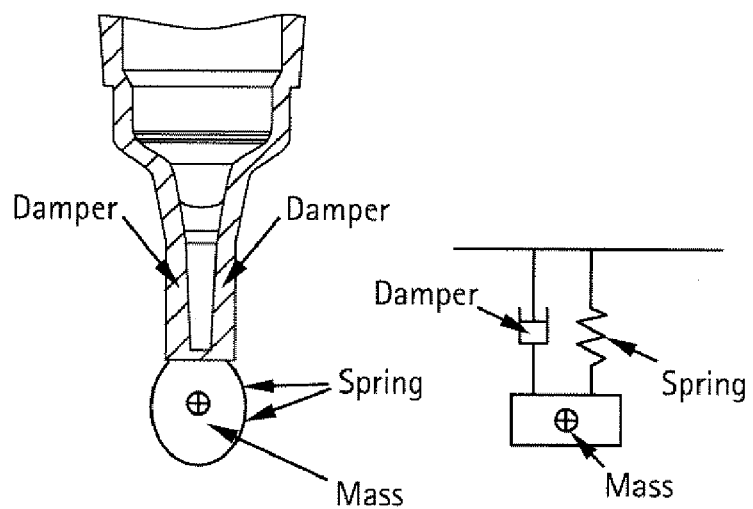
FIG. 5 is a depiction of a relationship between a mass/spring/damper of a mechanical system and a liquid in a dispensing probe tip according to a preferred embodiment of the present invention.

FIG. 5 shows the similarities in the response to a stimulus between a ball of fluid stretched outside a disposable tip, and the mechanical system on the right. The fluid viscosity and walls within the tip act similar to the damper on the right. Surface tension of the fluid/air interface on the drop and within the tip is similar to the spring on the right. The fluid mass inside and out of the tip is similar to the mass on the right. As the tip lifts, the fluid column is stretched and some fluid is pulled out, causing a vacuum. The backpressure caused by the surface tension after the break, along with the vacuum from the stretched fluid loads the system on the left similarly to displacing and holding the mass in the system on the right. Thus, the response of the fluid mass after the column break on the left is similar to releasing the stretched mass on the right. In view of these similarities it is possible to show the effect of surface tension on the response of the fluid mass after detachment.

Figure 6B:
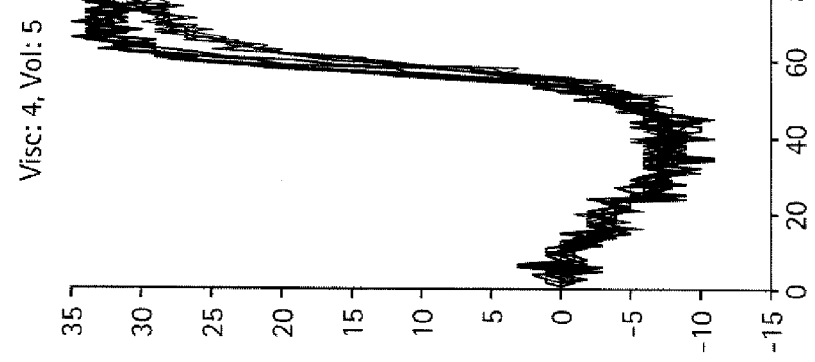
FIGS. 6A and 6B are pressure profiles in relative A/D values showing two different viscosity fluids according to a preferred embodiment of the present invention. (Relative A/D values can be traced back to scientific units of pressure through simple linear transfer functions.)
Figure 6A:
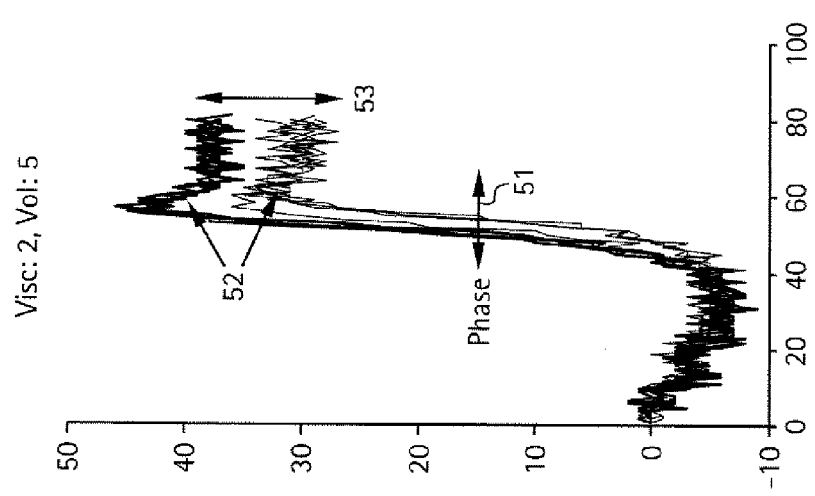

FIGS. 6A and 6B are similar to FIG. 4 and shows pressure profile for fluid column separation of a fluid from a probe tip dispenses onto a work surface such as a dry chemistry slide. FIG. 6A represents a lower viscosity fluid, whereas FIG. 6B represents a higher viscosity fluid. In both figures there are two plots, one for a fluid having a high surface tension and the other a fluid having a low surface tension. Three features are noted in FIG. 6A. Arrow 51 represents the phase of each of the fluids. Arrow 52 represents the natural frequency of each of the fluids after the break of the fluid column. Arrow 53 represents the amplitude of the oscillation of the fluid. These three features can be used to estimate surface tension, such as by linear combiners or neural nets, both of which are known in the art. As FIGS. 6A and 6B clearly indicate, higher viscosity fluids reduce surface tension effects.

Figure 7:
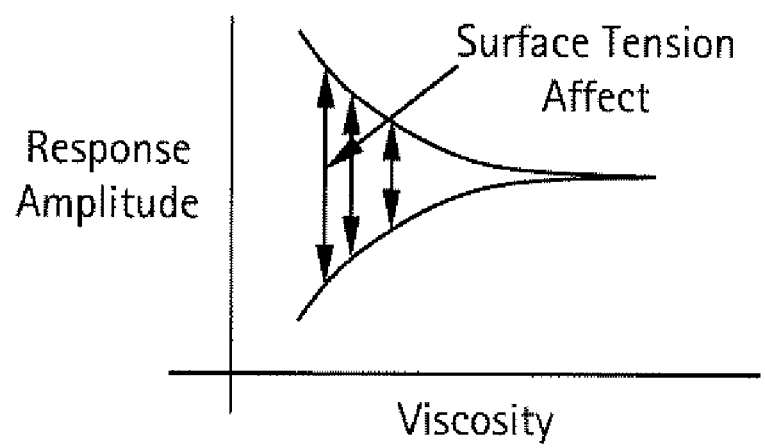
FIG. 7 shows the relationship between surface tension and viscosity according to a preferred embodiment of the present invention.

This relationship is shown schematically in FIG. 7. As FIG. 7 indicates the greater the viscosity of the fluid, the less effect the surface tension will have on the properties of the fluid during metering operations such as an aspiration or dispense. This relationship can be used in error mode detection as described in greater detail below.

To estimate the surface tension of a fluid, features are first extracted from a training set of sensed physical events during algorithm development. Calibration curves are then created between select features and surface tensions known a-priori. Coefficients from curve fitting (i.e. numbers that define the relationship between features and a surface tension) are later used in equations with the select features extracted from new physical events to estimate their surface tensions.

2. Using Fluidic Properties to Improve Precision and Accuracy of Fluid Metering

A. Bubble Size Estimation

Figure 8:
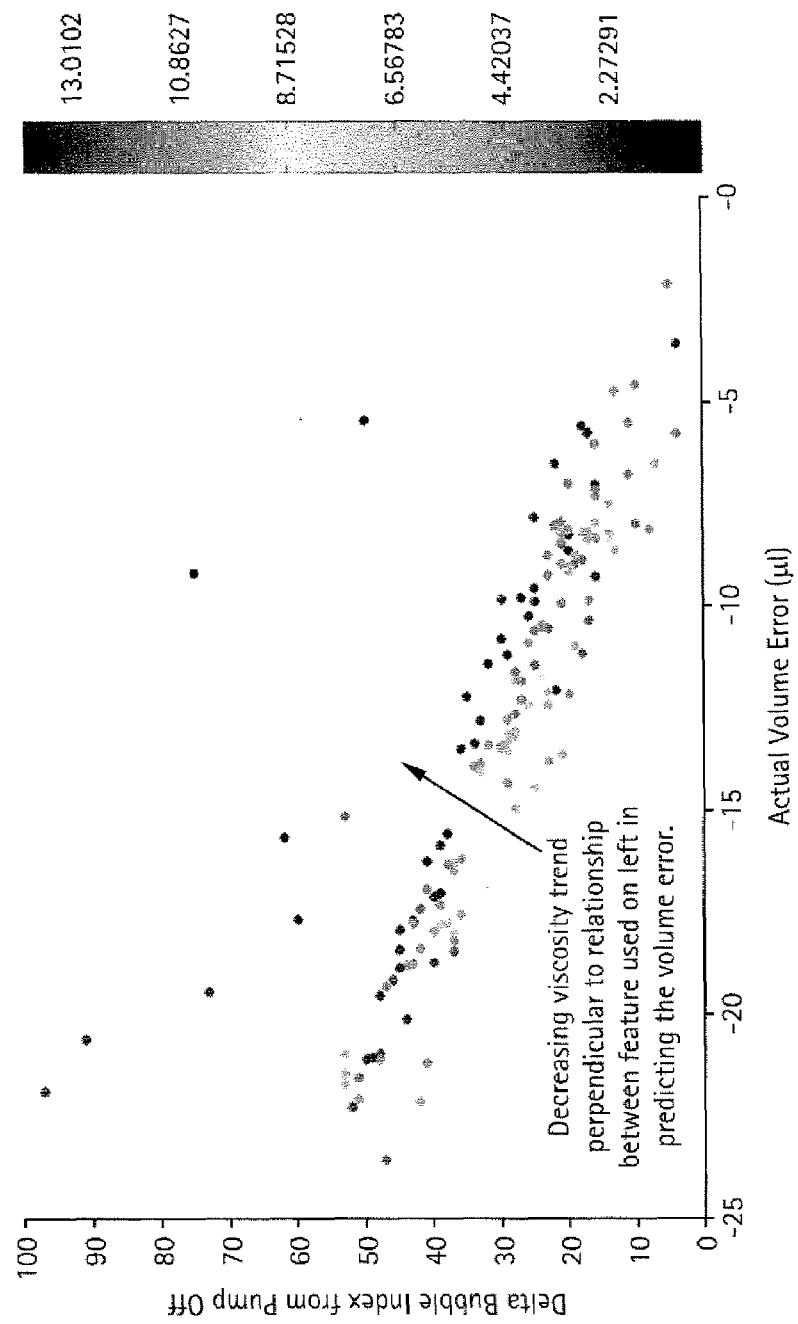
FIG. 8 is a graph showing the effect of viscosity on volumetric error according to a preferred embodiment of the present invention.

Aspiration of bubbles by a metering probe or tip during aspiration of the desired fluid can affect the precision and accuracy of the amount of fluid aspirated and ultimately dispensed. The estimated viscosity as described above, can be used as an additional feature to estimate bubble size and thus provide the actual amount of fluid that is dispensed. The plot shown in FIG. 8 shows a relationship between a select feature and the known aspirated error volume. The select feature is the predicted bubble time referenced from the point when the pump is turned off. This corresponds to the time difference between the start of a bubble aspiration and the known mechanical position of the pump piston, such as the time the pump is turned off. One frequently references "ground truth error volume", in evaluating algorithm performance. "Ground Truth" describes a set of values that one has confidence describes the reality of a situation. Very frequently "ground truth" is acquired from other sources during development which are inaccessible in production applications. In this example, the disposable tips were weighed before and after aspiration, and with knowledge of the fluid density, the volume that was aspirated was determined. These values are considered "ground truth", and are used for both training calibration functions as well as evaluating algorithm performance.

In FIG. 8, color represents the estimated viscosity as determined above. As FIG. 8 shows the viscosity trend is perpendicular (orthogonal) to the relationship between the bubble start index and the ground truth volume error. That is, for the same volume error (i.e., bubble size), higher viscosity fluids (represented by shading in FIG. 8) had a lower bubble start index. Observing that there is correlation between the viscosity, bubble break index and ground truth volume error, one can create a better estimator for dispensed volume error by using both of these features in a linear combiner. Based on the estimated bubble size, we can specifically modify the number of pump steps taken in dispense, and recover what would have been a failed dispense event with improved accuracy or precision of the metered fluid.

B. Correcting Viscosity Effects on Aspiration

Figure 9:
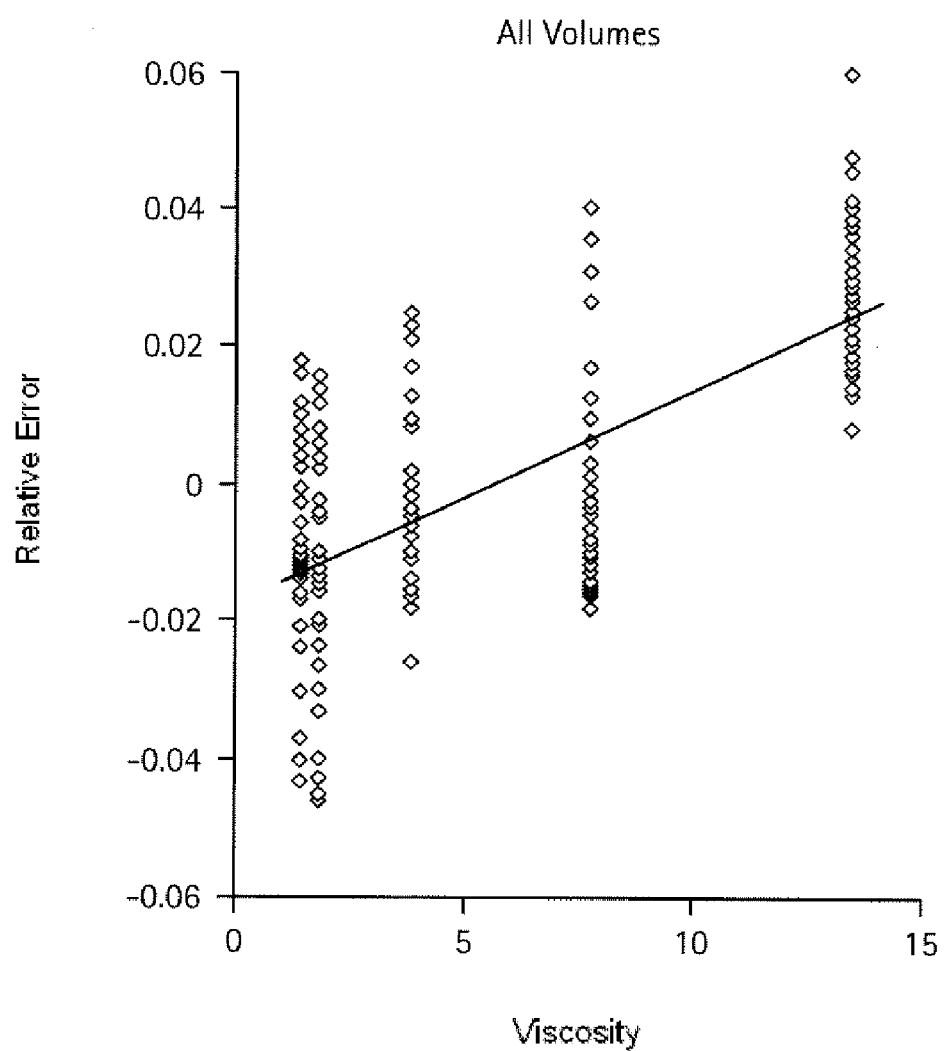
FIG. 9 is a graph showing relative error of aspiration volume as a function of viscosity according to a preferred embodiment of the present invention.

It has been observed that viscosity, per se, can cause a bias in the amount of fluid actually aspirated. As shown in FIG. 9, increasing viscosity causes an increase in the relative error of the aspirated volume of fluid. This is the case even after other simple corrections such as "volume" based fixes are implemented. Volume corrections arose from correcting a bias in the ground truth metered volume vs. the target metered volume. Things such as mechanical geometry can cause this bias.

Figure 10:
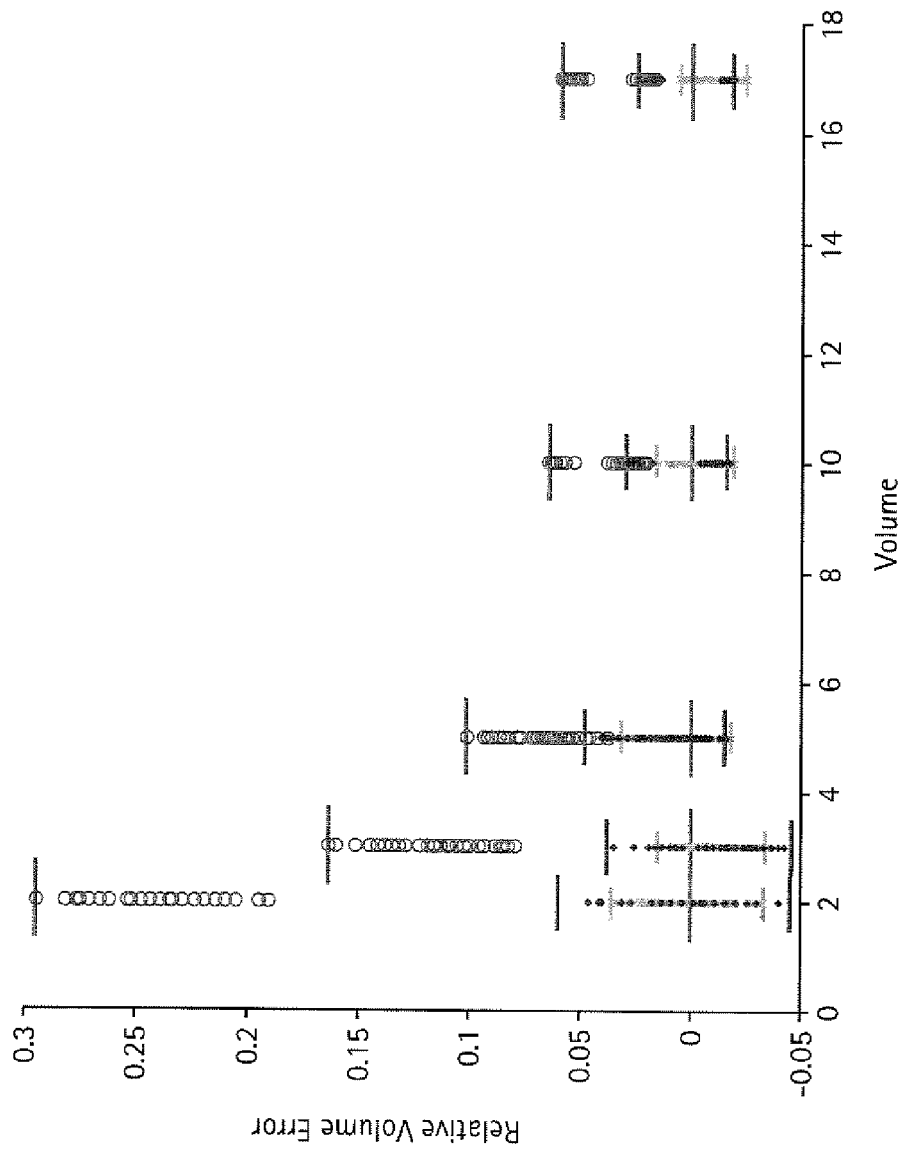
FIG. 10 is a graph showing relative error for different aspiration volumes before any compensation, after volume-based compensation and after viscosity compensation according to a preferred embodiment of the present invention.

The assumption that "X pump steps will displace Y micro liters of fluid" is not perfect. Generally, the force balance inside the control volume (tip/probe) changes as more fluid enters the tip. Because of this one performs a "volume based correction", or an additional offset in the requested metered volume based on the requested volume itself to achieve more accuracy in the final metered volume. As shown in FIG. 10, the relative error is decreased significantly after both volume based compensation and viscosity based compensation which uses the estimated viscosity as described above. In FIG. 10, the dots indicated no compensation, the dots represent volume-based compensation and the dots represent both volume-based and viscosity compensation. Viscosity compensation is performed by a utilizing the viscosity estimate in an equation whose output is a modification to the requested metered volume. By metering this new requested volume, the actual metered volume will have better precision and accuracy relative to the original requested volume.

C. Improving the Detection of Fluid Column Separation

In diagnostic analyzers an event called perfusion occurs when sample is not successfully dispensed to a target media, such as a dry slide. As used herein, "perfusion" is defined as an event where fluid hanging from a metering probe or a disposable tip of a metering probe runs up the side of the tip/probe. The net result is that the assay is run without sample or insufficient sample, leading to erroneous results or an error message.

It is desirable to detect the detachment of the fluid column that spanned the slide and the tip orifice. If a feature showing a fluid column break was present in the pressure profile then one can be assured that fluid was in fact in contact with the slide, guaranteeing a dispense occurred and hence no perfusion. Example fluid column detachments can be seen in pressure profiles in FIGS. 4, 6A and 6B. FIGS. 6A and 6B show the differences in the shape of the pressure profile after detachment as a function of viscosity. The response changes from under-damped in low viscosity fluids to damped in higher viscosity fluids.

One algorithm that can be used to detect detachment and hence perfusion uses a matched filter. A matched filter as known in the art is obtained by correlating a known signal, or template, with an unknown signal to detect the presence of the template in the unknown signal. This is equivalent to convolving the unknown signal with a time-reversed version of the template (cf. convolution). The matched filter is the optimal linear filter for maximizing the signal to noise ratio (SNR) in the presence of Gaussian white noise. Matched filters are commonly used in radar, in which a signal is sent out, and one measures the reflected signals, looking for something similar to what was sent out. Pulse compression is an example of matched filtering. Two-dimensional matched filters are commonly used in image processing, e.g., to improve SNR for X-ray pictures.

In the present invention matched filtering analyzes the correlation between the pressure signal of the fluid being dispensed and a template used in the matched filter. The template is a signal that describes the expected response trying to be matched. The template is developed from pressure profiles with fluids having known or estimated viscosities and surface tensions. Surface tension can be estimated as described above. The estimated or actual viscosity information is used to modify the templates as shown in FIG. 11.

Figure 11:
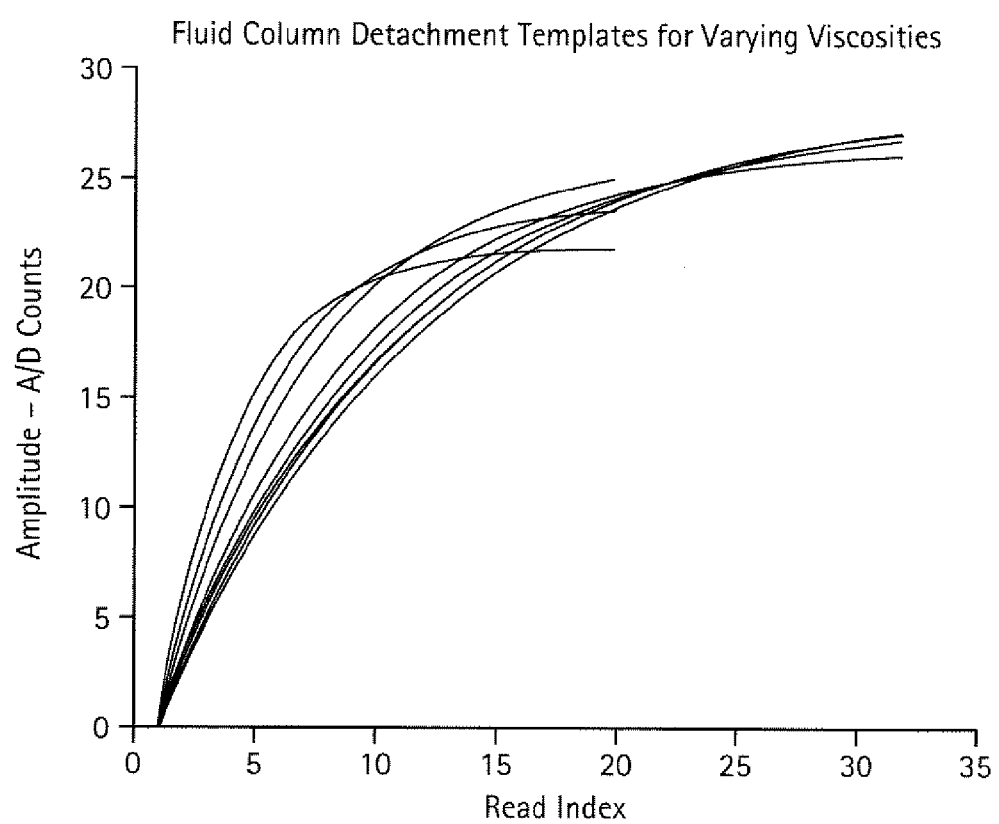
FIG. 11 is a graph showing different templates developed according to the present invention used in matching fluid column detachments as a function of viscosity according to a preferred embodiment of the present invention.
Figure 12:
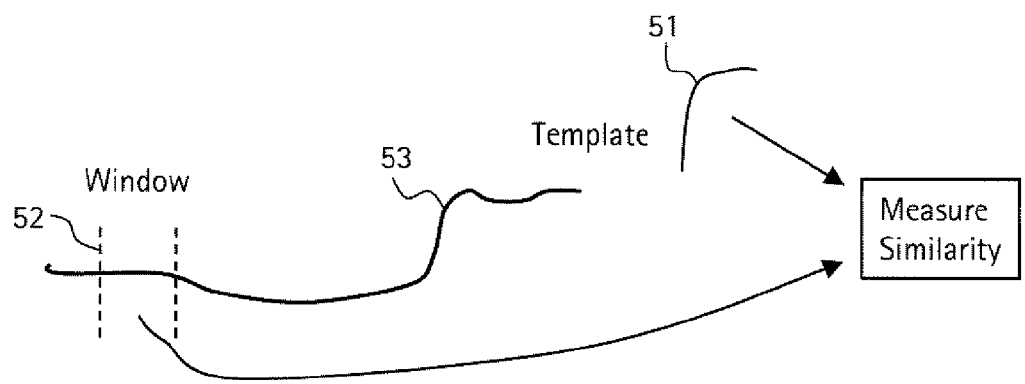
FIG. 12 shows a schematic diagram of a perfusion detection algorithm according to a preferred embodiment of the present invention which uses the templates of FIG. 11.

The templates in FIG. 11 span expected pressure signature responses in fluid column detachment for viscosities 4 through 10 cp. As the viscosity gets higher, the exponential changes, as well as the amplitude. Changes to the shape of the template through usage of viscosity compensation allow this algorithm to function well beyond the expected operating range of input fluid properties. FIG. 12 shows a high level overview how the perfusion algorithm works.

The algorithm takes the estimated viscosity of the fluid being dispensed as determined above and uses that to generate a template similar to the templates in FIG. 11. In a preferred embodiment, the template is generated by an optimization against some curves experimentally derived to determine best fit coefficients, so that later one can simply plug in viscosities, run a function and generate a template. The template 51 is compared to a section or window 52 of the pressure profile 53 similar to that shown in FIG. 4 and analyzed using correlation to determine if the pressure profile at that increment fits the template. Then the window is moved further down, and another correlation occurs. The template is moved along the pressure profile and it searches for a correlation. The maximum correlation value is thresholded, and index retained. If the maximum correlation exceeds a predetermined threshold, then the dispense occurred without perfusion. In other words if there is an increment of the pressure profile that matches the template to within a predetermined correlation, the dispense was successful and no perfusion occurred. Otherwise a perfusion error is logged. The index of maximum correlation is what can be fed into the algorithm to detect phase in surface tension estimation described in a previous section. Knowing the surface tension of a fluid, one can take that fluidic property and compare it to different dispensed volumes to look for trends/bias attributed to surface tension and build a correction for it to yield a more accurate dispense. Likewise, one can see if surface tension is correlated to features that are used to predict failure modes such as bubbles during aspiration. For example, bubbles have an air/fluid interface, and the higher the surface tension, the stronger the signal amplitude during the bubble entrance into the tip. One can adjust thresholds that look for bubble errors as a function of surface tension.

2. Using Fluidic Properties to Improve the Detection of Failure Modes

Estimated fluidic properties can also be used to improve the sensitivity and/or specificity of failure modes. As used herein "sensitivity" is defined as the probability of detecting something, i.e., a failure mode. As used herein "specificity" is defined as the probability that what was detected, i.e., the failure mode, is in fact, correct. That is, specificity is the probability that the failure mode detected is correct and not a false alarm. In a preferred embodiment, estimating the fluidic property of surface tension as described above, can be used to improve the sensitivity and/or specificity of error modes. This is particularly the case with lower viscosity fluids. A "lower viscosity fluid" is defined as a fluid having a viscosity of $\leq 3.5$ centipoises (cp), more preferably $\leq 2.5$ cp. Particularly preferred lower viscosity fluids are patient serum samples having a viscosity of 1.5 to 2.5 cp. As described above, higher viscosity fluids tend to dampen the effect of surface tension. Accordingly, surface tension will play a smaller role in failure modes in higher viscosity fluids.

Lower viscosity, high surface tension fluids, may impose higher frequency oscillations into pressure profiles due to the condition of being under damped as illustrated in FIG. 6A. This may cause increased noise which may cause an increased false alarm rate. If a fluid is estimated to have a lower viscosity and higher surface tension using the techniques described above, this information can be used to improve specificity by taking into account the noise due to oscillations. Conversely, higher viscosity fluids will generate a more attenuated signal, which may cause a decreased sensitivity. In other words surface tension and viscosity may affect failure modes by causing reduction in signal to noise ratios in error mode detection algorithms in the following two ways:

1) increased surface tension and lower viscosity increases noise power, leading to potentially decreased sensitivity;

2) increased viscosity reduces signal power, leading to potentially decreased specificity.

Thus based on the knowledge of the effect that fluidic properties can have on sensitivity and specificity of determining failure modes, algorithms to detect failure modes can be constructed which take into account the fluidic properties and their affect on the ability to detect failure modes.

The method for improving accuracy and precision of a metered fluid and in detecting error modes according to the present invention can be implemented by a computer program, having computer readable program code, interfacing with the computer controller of the analyzer as is known in the art.

It will be apparent to those skilled in the art that various modifications and variations can be made to the compounds, compositions and processes of this invention. Thus, it is intended that the present invention cover such modifications and variations, provided they come within the scope of the appended claims and their equivalents.

The disclosure of all publications cited above are expressly incorporated herein by reference in their entireties to the same extent as if each were incorporated by reference individually.

We claim:

1. A method for improving the accuracy or precision of a metered fluid, comprising:
    estimating a fluidic property of the fluid being metered by monitoring a physical event during the metering operation to collect sensed data;
    extracting features from the sensed data; and
    using the features to estimate fluid properties; and
    adjusting one or more control parameters based on the estimated property to improve the accuracy or precision of a metered fluid, wherein the estimated fluidic property is viscosity and the sensed data is a pressure profile during a fluid aspiration.

2. A method as claimed in claim 1, wherein the viscosity is estimated.

3. A method as claimed in claim 1, wherein the control parameter adjusted is the distance a piston of a piston pump travels.

4. A method as claimed in claim 1, wherein the viscosity is used to provide a bubble size determination during a fluid aspiration.

5. A method as claim in claim 4, wherein the bubble size is used to estimate the aspirated fluid volume.

6. A method as claim in claim 5, wherein the bubble size is used to determine if enough fluid is present for further testing, or whether a new fluid must be aspirated.

7. A method as claimed in claim 5, wherein the fluid is a bodily fluid sample used in a diagnostic analyzer.

8. A method as claimed in claim 1, further comprising a diagnostic analyzer which includes a metering probe having a hard probe or a probe having a disposable tip and wherein the fluid is a body fluid sample.

9. A method as claimed in claim 8, wherein the analyzer further comprises a media for receiving sample from the disposable tip and further comprising estimating the fluidic property of the surface tension of the sample.

10. A method as claimed in claim 9, wherein the estimation of the surface tension comprises, establishing a fluid column between the disposable tip and the media for receiving sample, lifting the tip away from the media while measuring the physical event of the pressure profile, tracking how long the fluid column is stretched based on the pressure profile and estimating surface tension based on how long the fluid column is stretched.

11. A method as claimed in claim 10, wherein calibration curves of pressure profiles for fluids having known surface tensions are compared to the pressure profile of the fluid being measured.

12. A method for improving the detection of a failure mode, comprising:
    estimating a fluidic property of the fluid being metered; and
    adjusting one or more control parameters or thresholds that determine when an error is flagged based on the estimated property to improve the detection of the failure.

13. A method as claimed in claim 12, wherein the estimating the fluidic property of the fluid being metered comprises:
    monitoring a physical event during the metering operation to collect sensed data;
    extracting features from the sensed data; and
    using the features to estimate fluidic properties.

14. A method as claim in claim 13, wherein the estimated fluidic property is viscosity and the sensed data is a pressure profile during a fluid aspiration.

15. A method as claimed in claim 14, wherein the error is perfusion and the viscosity is used to determine if a perfusion error has occurred.

16. A method as claimed in claim 13, wherein the fluidic property is surface tension and the sensed data is a pressure profile during a fluid column separation from a work piece.

17. A method as claimed in claim 16, wherein the surface tension pressure profile is threshold adjusted to sense the entrance of bubbles into a metering tip during aspiration.

* * * * *